June 13, 1939. J. L. FRANKLIN Re. 21,111

PHONOGRAPHIC ANNOUNCING MECHANISM OR THE LIKE

Original Filed Feb. 28, 1934 10 Sheets-Sheet 1

INVENTOR

John L. Franklin

BY

Browne & Phelps

ATTORNEYS

June 13, 1939. J. L. FRANKLIN Re. 21,111

PHONOGRAPHIC ANNOUNCING MECHANISM OR THE LIKE

Original Filed Feb. 28, 1934 10 Sheets-Sheet 2

INVENTOR
John L. Franklin

BY
Browne & Phelps

ATTORNEYS

June 13, 1939. J. L. FRANKLIN Re. 21,111

PHONOGRAPHIC ANNOUNCING MECHANISM OR THE LIKE

Original Filed Feb. 28, 1934 10 Sheets-Sheet 3

INVENTOR

John L. Franklin

BY

Brown & Phelps

ATTORNEYS

June 13, 1939. J. L. FRANKLIN Re. 21,111

PHONOGRAPHIC ANNOUNCING MECHANISM OR THE LIKE

Original Filed Feb. 28, 1934 10 Sheets-Sheet 4

INVENTOR

John L. Franklin

BY

Browne & Phelps

ATTORNEYS

PHONOGRAPHIC ANNOUNCING MECHANISM OR THE LIKE

Original Filed Feb. 28, 1934 10 Sheets-Sheet 5

INVENTOR
John L. Franklin
BY
Browne & Phelps
ATTORNEYS

June 13, 1939. J. L. FRANKLIN Re. 21,111

PHONOGRAPHIC ANNOUNCING MECHANISM OR THE LIKE

Original Filed Feb. 28, 1934 10 Sheets-Sheet 6

INVENTOR

John L. Franklin

BY

Browne & Phelps

ATTORNEYS

June 13, 1939. J. L. FRANKLIN Re. 21,111

PHONOGRAPHIC ANNOUNCING MECHANISM OR THE LIKE

Original Filed Feb. 28, 1934 10 Sheets-Sheet 7

INVENTOR

John L Franklin

BY

Browning & Phelps

ATTORNEYS

PHONOGRAPHIC ANNOUNCING MECHANISM OR THE LIKE

Original Filed Feb. 28, 1934 10 Sheets-Sheet 8

INVENTOR

John L. Franklin

BY

Browne & Phelps

ATTORNEYS

PHONOGRAPHIC ANNOUNCING MECHANISM OR THE LIKE

Original Filed Feb. 28, 1934 10 Sheets-Sheet 9

INVENTOR

John L. Franklin

BY

Browne & Phelps

ATTORNEYS

PHONOGRAPHIC ANNOUNCING MECHANISM OR THE LIKE

Original Filed Feb. 28, 1934 10 Sheets-Sheet 10

INVENTOR

John L. Franklin

BY Brown & Phelps

ATTORNEYS

Reissued June 13, 1939

Re. 21,111

UNITED STATES PATENT OFFICE 21,111

PHONOGRAPHIC ANNOUNCING MECHANISM OR THE LIKE

John L. Franklin, Atlanta, Ga.

Original No. 2,011,216, dated August 13, 1935, Serial No. 713,417, February 28, 1934. Application for reissue April 27, 1939, Serial No. 270,385

32 Claims. (Cl. 179—6)

The invention relates to the field of phonographic devices useful as a combined time and advertising announcer and for many other purposes.

It is an object of the invention to provide a device that may be combined with one or a plurality of telephones to automatically speak the time over the telephone to the nearest full minute.

It is a further object of the invention to provide a device having no physical connection with the telephone circuits which will perform the stated function for long periods of time without attention.

It is a further object to provide a device of this character using two records utilized seriatim to reproduce a single spoken sentence.

It is a further object to provide a time announcing device actuated automatically in response to a telephone call, which will hold calls on any one or more phones associated therewith, which calls are completed while the device is in operation in response to a previous call or calls, and when said announcement in process is completed will immediately repeat the announcement over the later calls which have been "stored" in the meantime.

It is a further object to provide means to lock out the announcement initiation while the records are being shifted and to lock out the record shifting means while an announcement is in process.

It is a further object to improve the quality of reproduction of sounds by photo-electric reproduction.

It is a further object to provide novel means for changing a record automatically so that different ones of a plurality of records upon a carrier may be in position at various times.

Further objects of the invention will appear from the following description when read in connection with the accompanying drawings showing an illustrative embodiment of the invention, and wherein.

Figure 1:
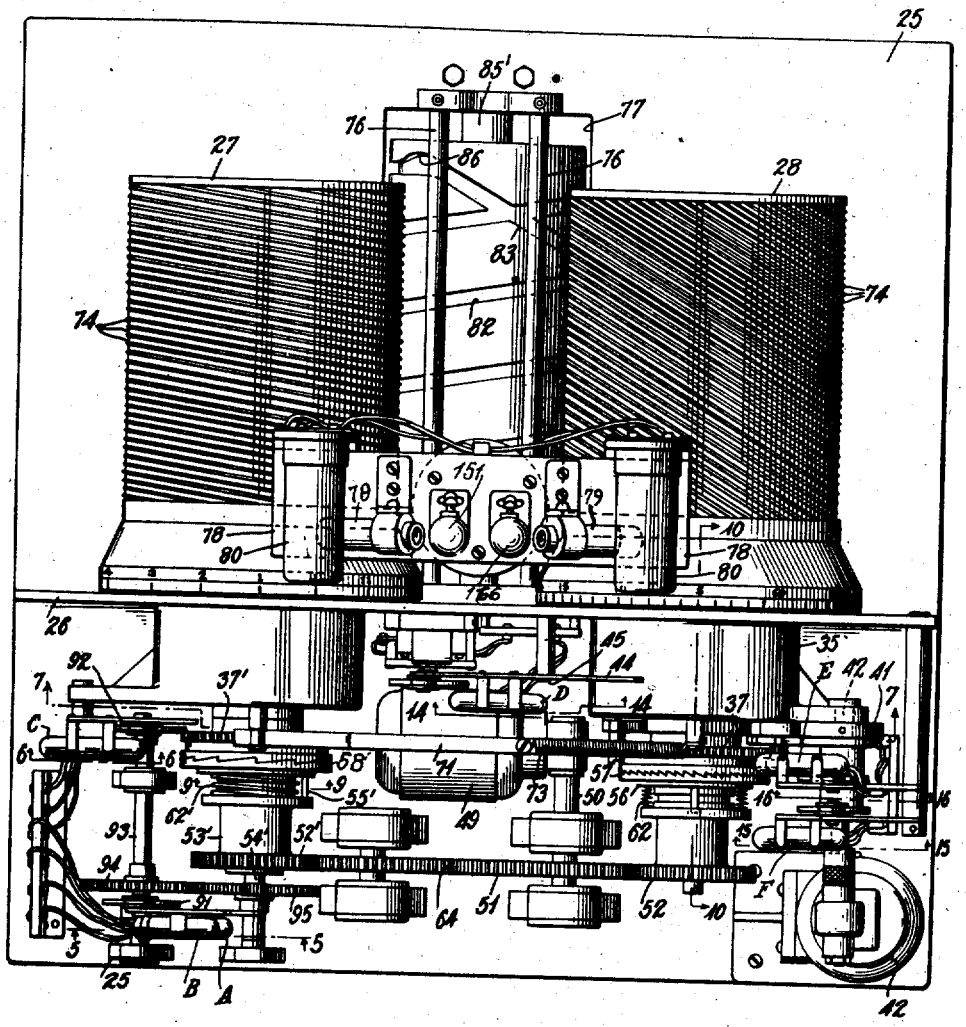
Fig. 1 is a plan view.
Figure 5:
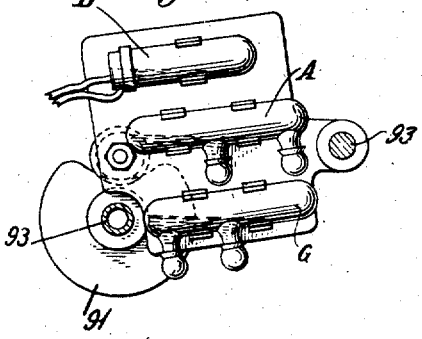
Figure 6:
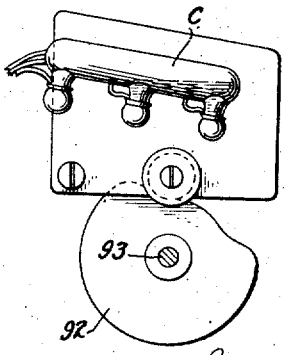
Figure 7:
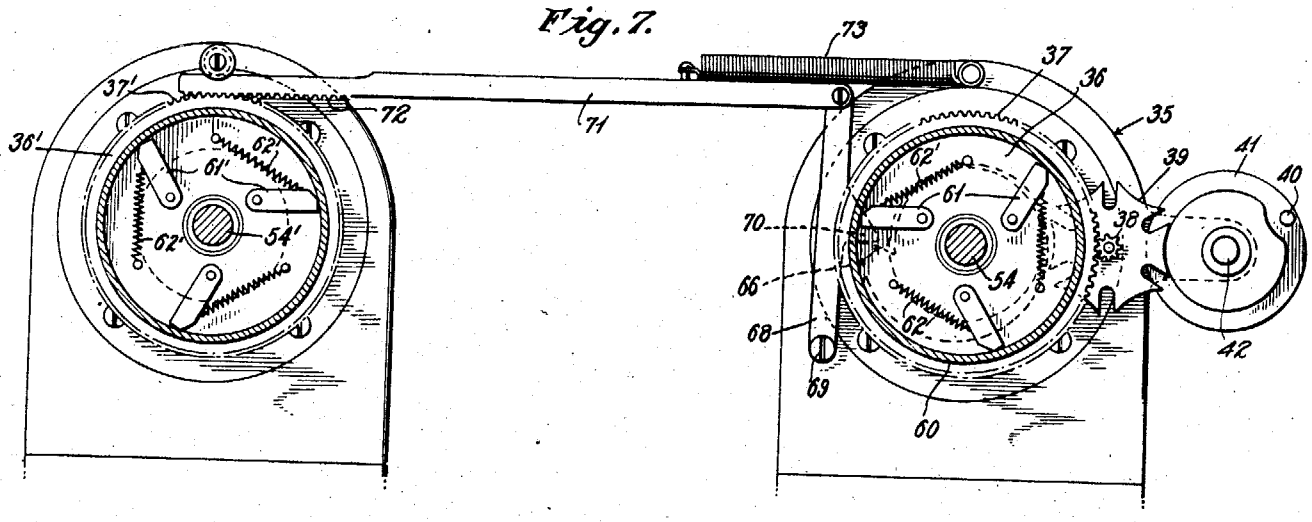
Figure 9:
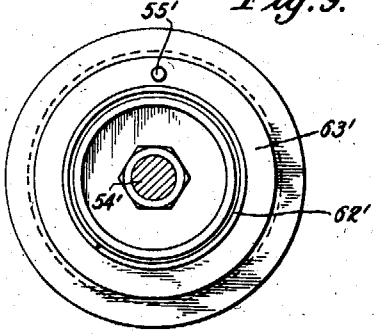
Figure 8:
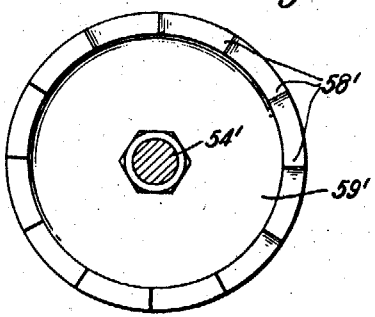
Figure 10:
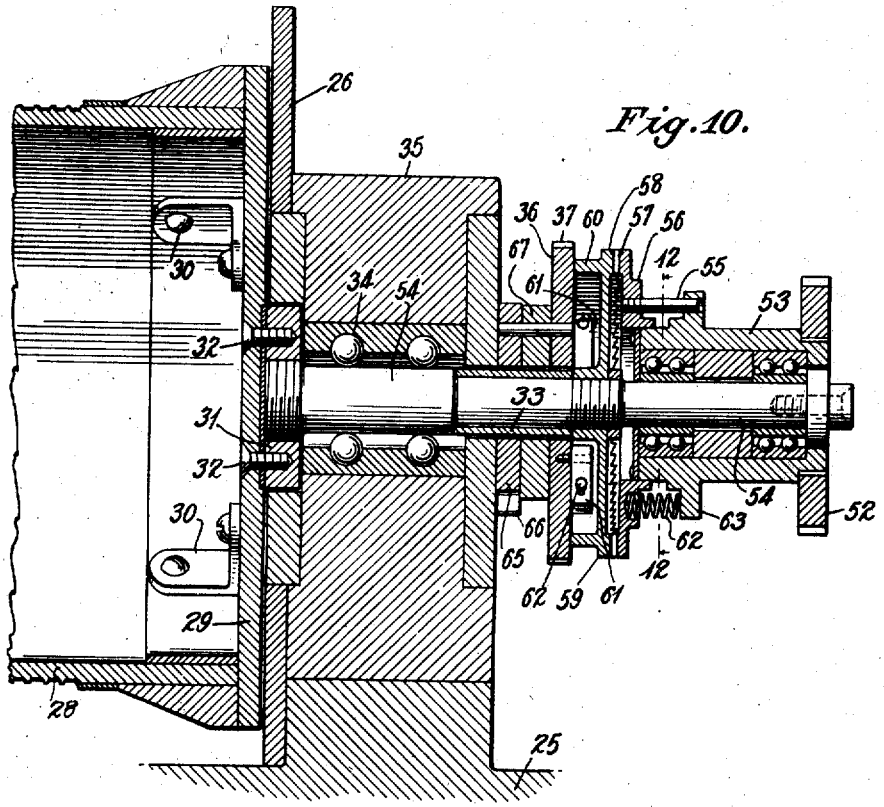
Figure 11:
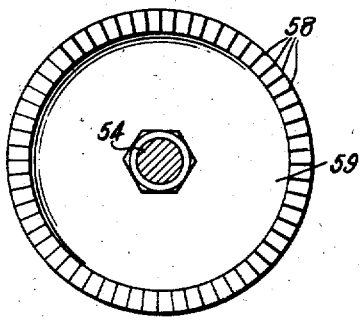
Figure 12:
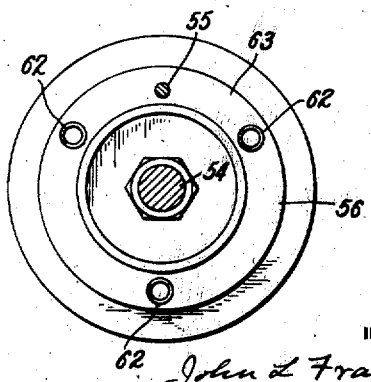
Figure 16:
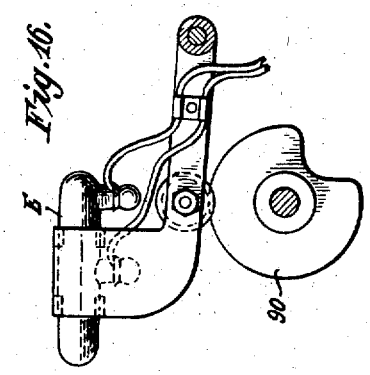
Figure 15:
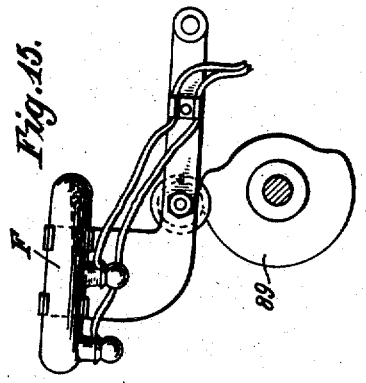
Figure 14:
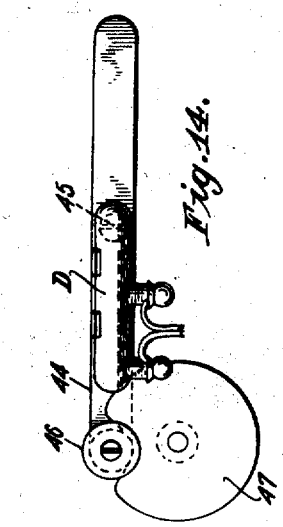
Figure 13:
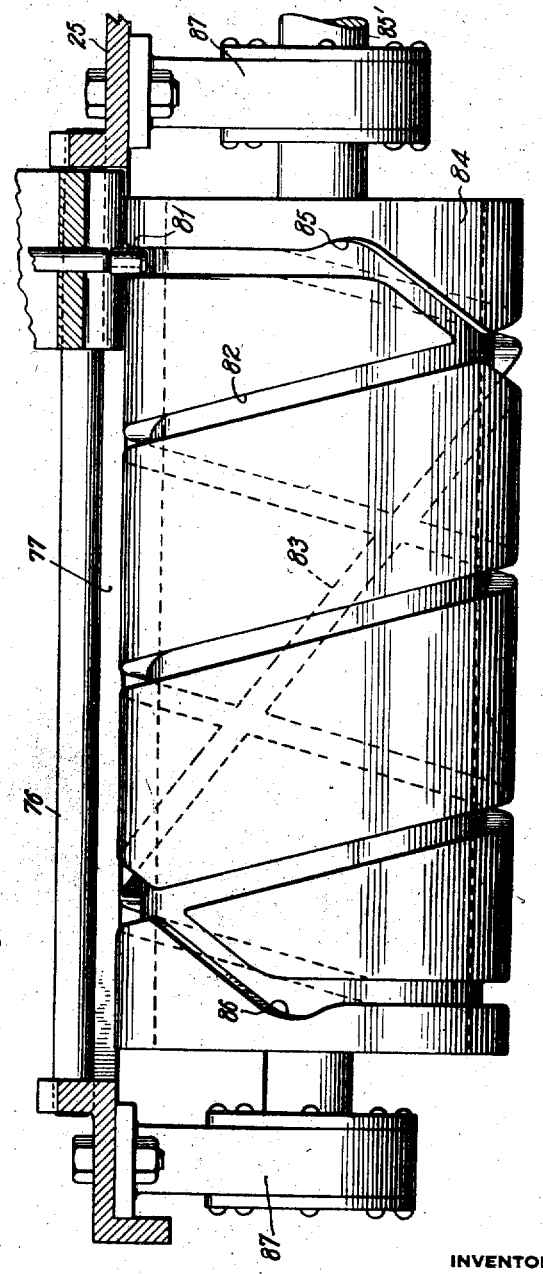
Figure 17:
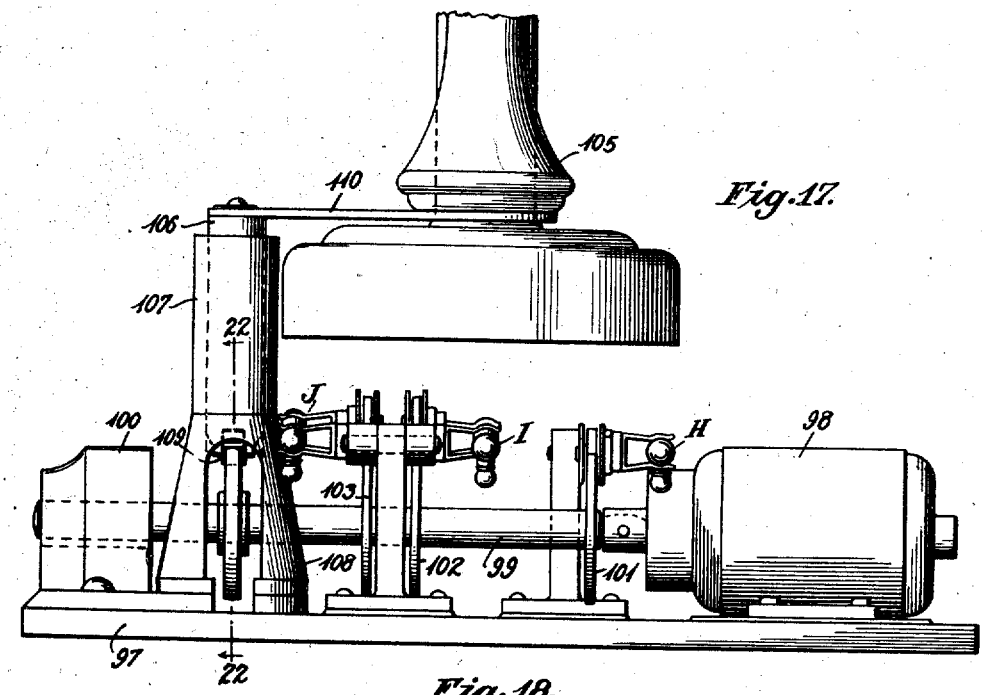
Figure 18:
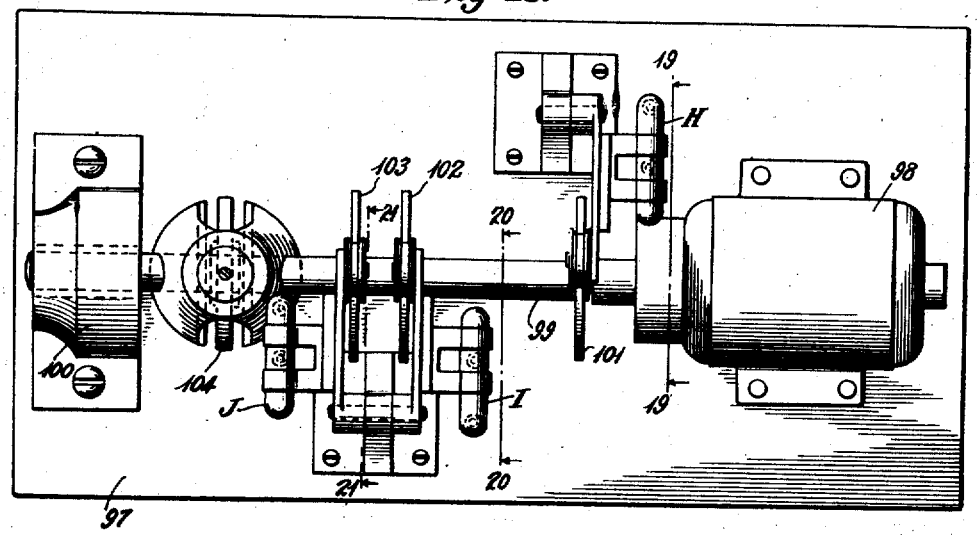
Figure 19:
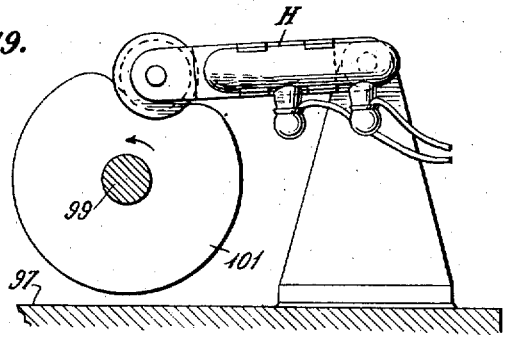
Figure 20:
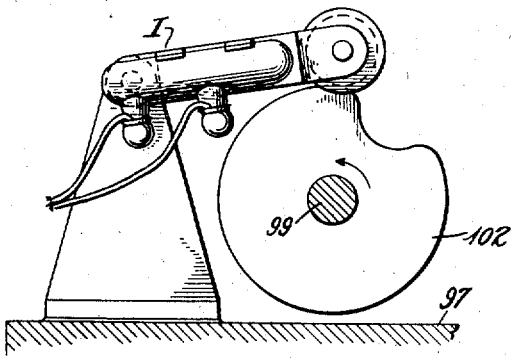
Figure 21:
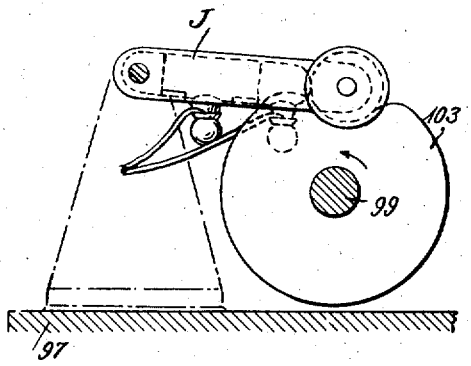
Figure 22:
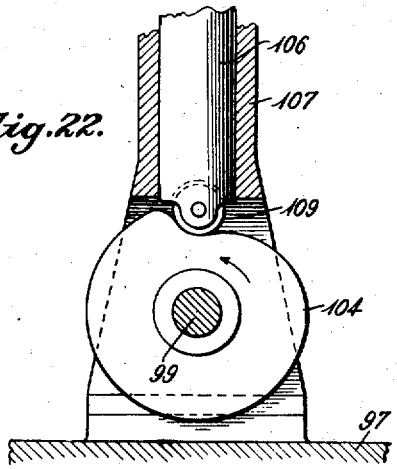
Figure 23:
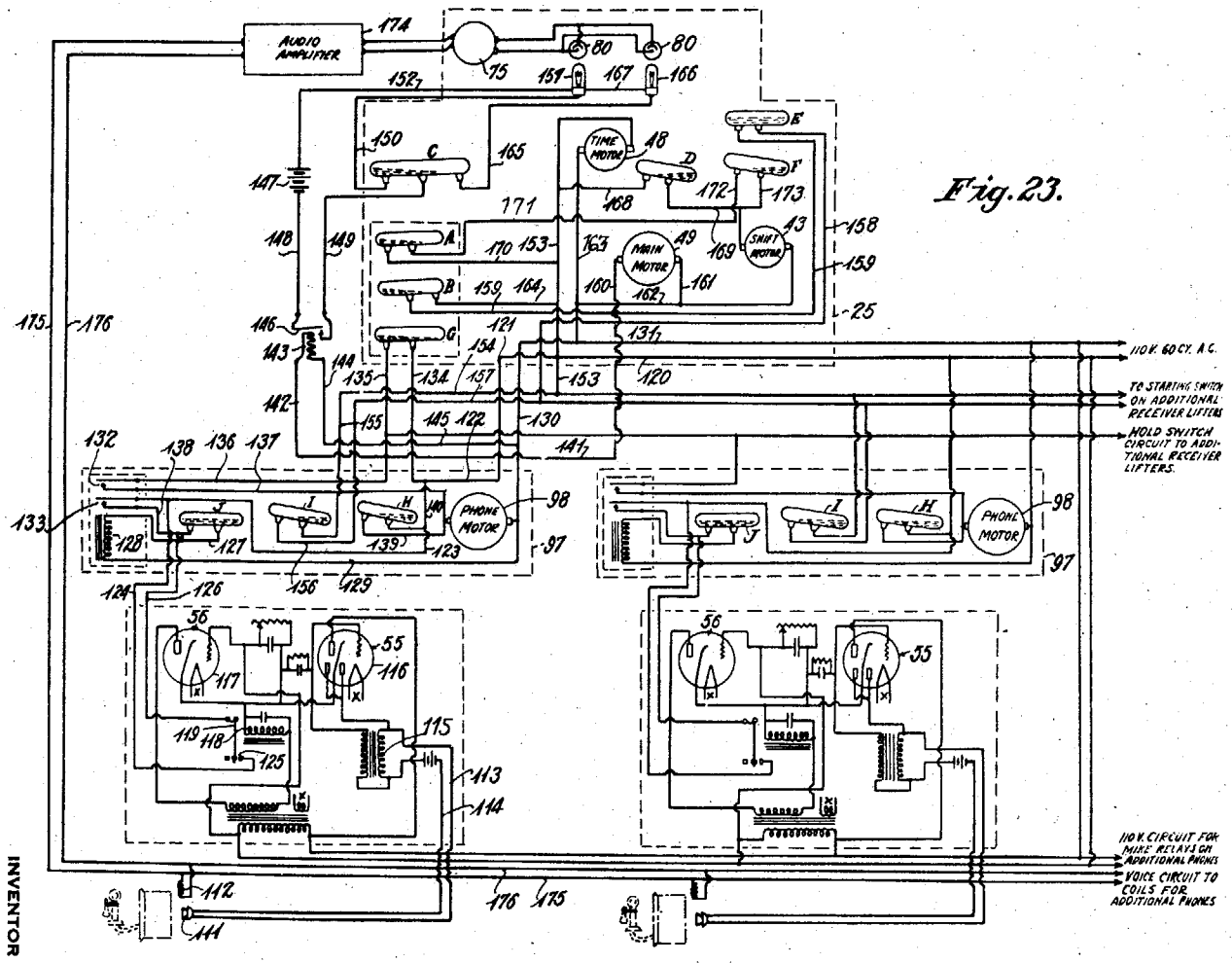
Figure 24:
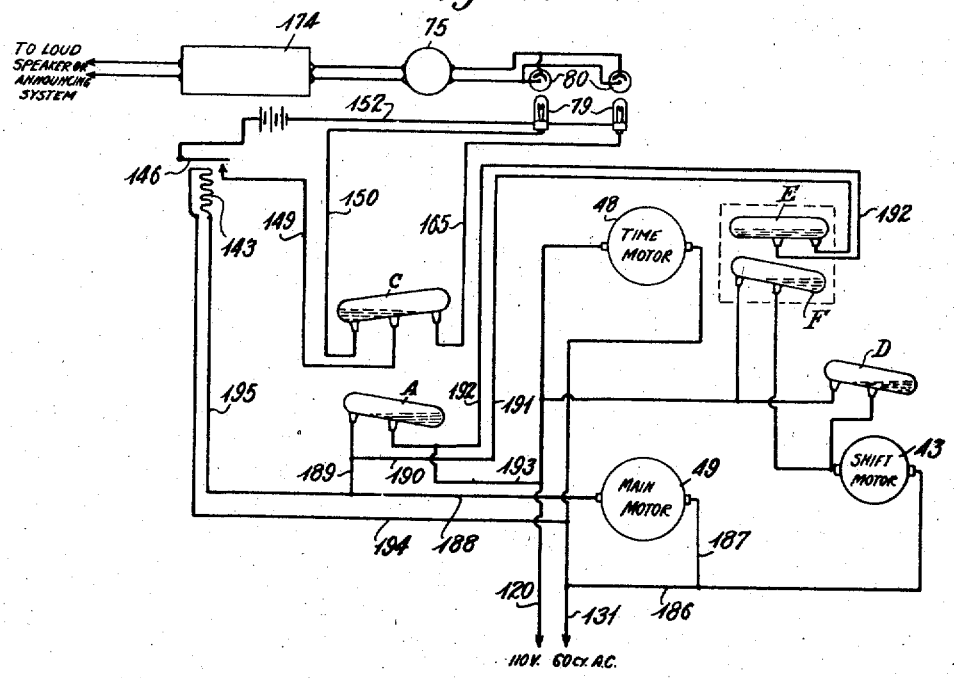

Figs. 5 and 6 are sections drawn to an enlarged scale, taken on lines 5—5 and 6—6, respectively, of Fig. 1, showing the standing position of certain switches;

Fig. 7 is a section on an enlarged scale, on line 7—7 of Fig. 1;

Fig. 8 is a face view of the hour record shifting ratchet;

Fig. 9 is a section on line 9—9, Fig. 1, on an enlarged scale;

Fig. 10 is a detail section on line 10—10 of Fig. 1 on an enlarged scale;

Fig. 11 is a face view of the minute record shifting ratchet;

Fig. 12 is a section on an enlarged scale taken on line 12—12 of Fig. 10;

Fig. 13 is a side elevation of the reproducer carrier driving cam with frame parts shown in section;

Figs. 14, 15, and 16 are sections on corresponding lines of Fig. 1 showing standing position of certain additional switches with their actuating cams;

Figs. 17 is a side elevation of a receiver lifter and switch actuator;

Fig. 18 is a plan view of the structure of Fig. 17 omitting the fragment of the telephone instrument;

Figs. 19, 20, and 21 are sections on the corresponding lines of Fig. 18 showing standing positions of switches actuated by the receiver lifter;

Fig. 22 is a detail section on line 22—22 of Fig. 17;

Fig. 23 is a diagram of circuits;

Fig. 24 is a diagram of a modified form of circuits; and

Figure 25:
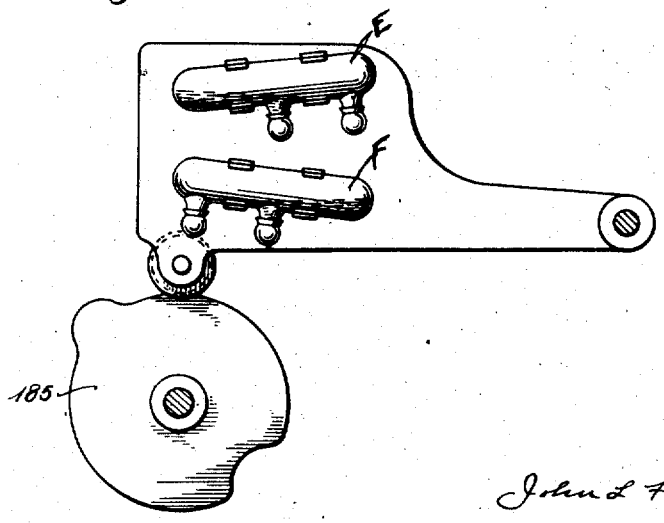

Fig. 25 is a diagrammatic view of a form of cam to be used with the circuits of Fig. 24.

As shown the device comprises three principal mechanisms inter-connected electrically or mechanically, or both, in such manner as to each control the action of the other two under some conditions. The mechanisms referred to are sound reproducing mechanism, record shifting mechanism, and mechanism to associate telephones with the sound reproducing mechanism. There is also a system of electric control whereby the actuation of each of said mechanisms is correlated.

The sound reproducing and record shifting mechanisms are shown as mounted on a base 25 provided with an upstanding transvere slab 26.

To support film sound record strips, the cylinders 27, 28 are shown each formed as shown for cylinder 28 in Fig. 10 with a face plate 29 which may be secured to the cylinder by means of angles 30. The face plate is shown as removably secured to a ring 31 by means of screws 32, the ring 31 being screwthreaded on shaft 54 and standing flush with slab 266.

*Record shifting mechanism*

To revolubly support the cylinder, shaft 54 is mounted in anti-friction bearings 34 in block 35.

The shaft 54 is arranged to be driven, through a one-way clutch to be described, by disk 36 fixed on sleeve 33 freely revoluble on shaft 54, a step at a time, by means of gear teeth 37 on the edge of the disk in mesh with pinion 38 carried upon the hub of Geneva gear 39 operated by pin 40 carried by disk 41 once in each revolution of the disk 41, said disk 41 being fast on shaft 42, driven by motor 43.

The motor 43 is controlled by mercury switch A to make a full rotation of shaft 42 once during each minute, the said rotation being made during a very few seconds after which the motor is stopped by circuits and switches to be described.

To operate the mercury switch D, which is mounted on an arm 44, see Fig. 14, pivoted at 45 on a fixed pivot, the arm carries a roller 46 riding on a cam 47. The cam 47 is driven at the rate of one revolution per minute by any suitable timing operator as by the synchronous motor 48. The switch D being briefly closed and then again opened by the continuously rotating cam 47, the motor 43 will start and close a hold circuit by means to be described which will cause the motor to complete the turn of disk 41.

The record carrying cylinders 27, 28 are shown as formed with grooves to guide the placement of sound film records thereon.

Cylinder 27, shown as the hour announcing cylinder, is formed with twelve spiral grooves in the nature of a twelve thread screw, while cylinder 28, shown as the minute announcing cylinder, is formed with sixty spiral grooves in a like manner. It follows that turning or shifting of cylinder 27 one-twelfth of a revolution or of cylinder 28 one-sixtieth of a revolution will bring the succeeding record into reproducing position.

Cylinder 28 is so shifted each minute as above described.

To shift cylinder 27 once each hour, sleeve 33 carries a cam 65, the cam shown as pinned to disk 36 with a spacer 67 interposed, see Fig. 10. Coacting with cam 65, an arm 68, Fig. 7, is shown pivoted upon block 35 at 69, and having a projection 70 bearing on the cam. The free end of arm 68 is pivoted to a bar 71 carrying rack teeth 72 in mesh with gear teeth 37' carried by disk 36'. The projection 70 is held against the cam by tensile spring 73 anchored at its ends to block 35 and to the arm 71 respectively, the strength of the spring being amply sufficient to easily turn cylinder 27. The arrangement is such that arm 71 will be gradually forced to the left in Fig. 7 during the successive minute shifting movements of cylinder 28 of each hour with yielding of overrunning clutch arms 61'. At the end of each hour the projection 70 will slip from the step 66 allowing spring 73 to pull bar 71 to the right to move the ratchet teeth one step. The height of step 66 is just sufficient to allow cylinder 27 to be turned one-twelfth of a revolution or one tooth of the ratchet teeth.

The bases of cylinders 27 and 28 are shown as marked with properly designated graduations cooperating with a zero mark on slab 26 for convenience in setting the cylinders to a correct time-announcing position. The mechanism is so timed that at the end of each sound reproducing action the ends of the same record grooves will be in position to commence the next sound reproduction.

*Sound reproducing mechanism*

The cylinder 28 is driven in a sound reproducing direction by main motor 49 driving shaft 50 through a speed reducing gear, which shaft carries gear 51 in mesh with gear 52 carried by sleeve 53, Fig. 10, freely revoluble on shaft 54.

The sleeve 53 through pin 55 drives ring 56, which ring is formed with ratchet teeth 57 coacting with ratchet teeth 58, Fig. 11, carried by disk 59 fast on shaft 54.

Disk 59 is formed with an annular flange 60 against the interior surface of which clutch arms 61, Fig. 7, pivoted upon disk 36 are pressed by springs 62 shown as acting in tension.

To yieldingly press the ratchet teeth into engagement, springs 62 are provided acting in compression between ring 56 and flange 63 on sleeve 53. The pin 55 slides in an opening in flange 63. The disk 59 thus drives the shaft 54 for record shifting through clutch arms 61 and for sound reproducing by action of ratchet teeth 57, 58 with overrunning of the clutch arms 61.

The driving in sound reproduction of cylinder 27 is the same as that of cylinder 28 with the exception that an idle gear 64 is interposed between gear 51 and gear 52' to cause the cylinders to drive in opposite directions for convenience of design.

The spring 62' is shown as of a different design from springs 62 only for purpose of illustration of the fact that either form may be used.

To reproduce sound from photo-film sound records 74 carried in grooves on cylinders 27 and 28, there is shown a reproduced carriage comprising an upright casing 75 slidably mounted on rods 76 mounted over an opening 77 in base 25, and a plate 78 mounted on the casing 75. Mounted on the plate 78 are light sources 151, 166, the light from which is focused by lens systems carried in tubes 79 upon the film records and reflected into light sensitive cells, as selenium cells housed in casings 80 also mounted on plate 78. The casing 75 is utilized to house any known form of audio frequency amplifier, details of which are not necessary to illustrate.

To move the reproducer head, the carriage is shown, Fig. 13, as provided with a pivotally mounted shoe 81 traveling in and driven by cam grooves 82 and 83, the groove 82 causing outward travel and groove 83 return travel of the reproducer head with a single direction of rotation of the cylinder 84 in which the grooves are formed. The shoe 81 will be caused to pivot at the ends of its travel by means of the form of interconnection of the grooves 82, 83 at 85, 86 in a well known manner.

Figure 2:
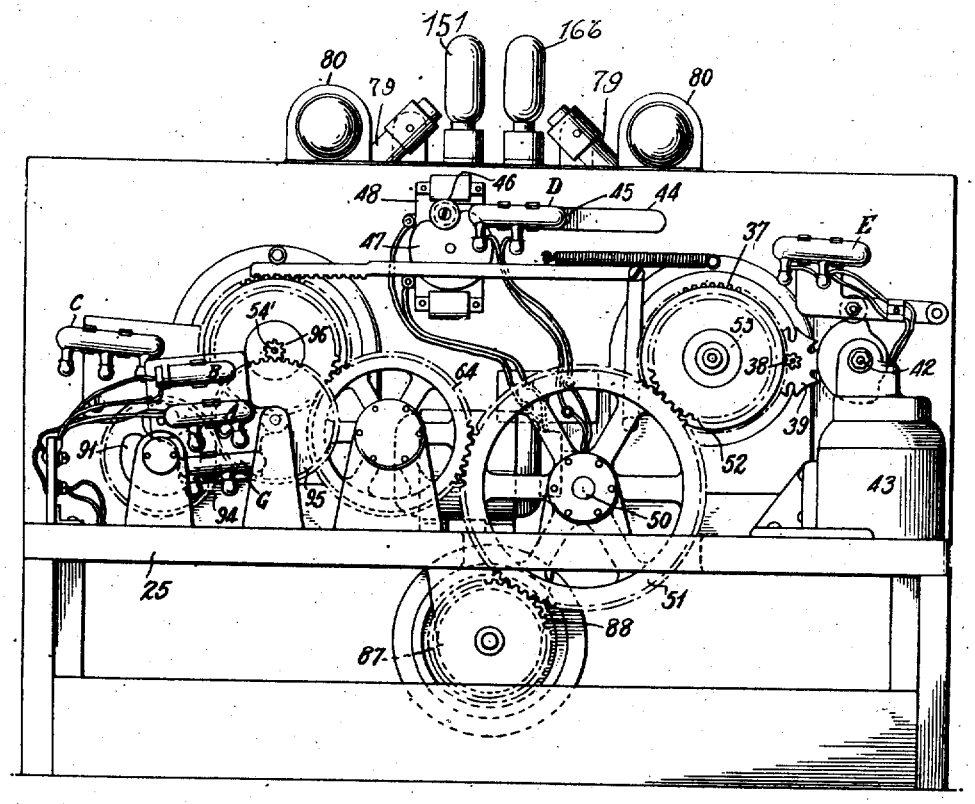
Fig. 2 is an end elevation.

The cam cylinder 84 is mounted on a shaft 85' in bearings 87, suspended from base 25, the shaft 85' being driven by gear 88 in mesh with gear 51, see Fig. 2.

To control the interactions of the various electrical drives and sound reproduction, the mechanism already described, in addition to mercury switch D, is provided with mercury switches E and F actuated by cams 89 and 90, respectively, which are fixed on shaft 42, and mercury switches A, B, C, and G, A, B, and C being all controlled by cam 91 and G being controlled by cam 92, cams 91 and 92 each being fixed on a shaft 93 driven by gears 94, 95, through pinion 96 fast on the end of shaft 54'. The ratio of gears 94, 95 and pinion 96 is such as to cause one revolution of shaft 93 for each complete out and back movement of the reproducer head.

*Telephone connector*

The mechanism for associating a telephone with the sound reproducing mechanism is, for purpose of convenient location, shown in Figs. 17 and 18 as mounted on a separate base 97. Said mechanism is shown as comprising a motor 98 driving a shaft 99 provided with an end bearing 100, the drive of said shaft being through reduction gear not shown. The control of motor 98, to be described, is such that shaft 99 will be given one complete revolution when a telephone call is completed, in a little more time than will be required for a complete sound reproduction act, whereupon motor 98 will be cut off.

Fixed on shaft 99 are switch cams 101, 102, 103 to control mercury switches H, I, and J, and receiver lifting cam 104. To lift the receiver 105 of a time announcing telephone, a plunger 106 is shown as slidably mounted in a cylinder 107 carried by a base 108, pierced by shaft 99 and secured on base 97. The plunger 106 is shown as carrying a roller 109 bearing on cam 104. The plunger 106 carries a plate 110 projecting beneath the receiver 105. When the shaft 99 and cam 104 are revolved in the direction of the arrow in Fig. 22, the receiver will be lifted and supported during a major portion of revolution of shaft 99 and lowered when the revolution is completed.

*Control*

As shown in the diagram of circuits, the device is designed to serve a plurality of telephones. As many as ten to fifteen telephones may be so served. At each telephone is a microphone 111 placed to be affected by the ringer. Also an induction coil 112 to be affected by the sound reproduction of the device which will induce in the telephone circuits the voice currents of the sound reproduction.

When the ringer of the telephone affects microphone 111, the pulsating current will act through wires 113, 114 to cause fluctuations in coil 115, which fluctuations will be amplified by tubes 116, 117 to cause coil 118 to be energized to attract armature 119, thus closing a circuit from power wire 120, wires 121, 122, 123, 124, contact 125, wire 126, mercury switch J, which is normally closed, wire 127, magnet 128, wires 129, 130, to power wire 131. Magnet 128 will then pull down armatures to close switches 132 and 133.

Closing of switch 132 will close a circuit from wire 120 through wires 121, 122, 134, normally closed mercury switch G, wires 135, 136, switch 132, wire 137, motor 98, wire 130, to wire 131, thus starting the receiver lifting motor. At the same time closing of switch 133 will close a circuit from wire 120 through wires 121, 122, 123, switch 133, wire 138, mercury switch J, wire 127, magnet 128, wires 129 and 130 to wire 131, the mercury switch J having been opened by the initial motion of shaft 99 caused by starting motor 98. The starting of motor 98 will also close mercury switch H, as shown in Figure 19, which will place a hold-up circuit on motor 98 through wires 131, 130, motor 98, wire 139, switch H, wire 140, wires 122, 121 to wire 120, which will keep the motor 98 running during one complete revolution of shaft 99, when mercury switch H will be opened to start motor 98.

The current passing through mercury switch G, as above described, will also close a circuit from wire 135 over wires 141, 142, solenoid switch 143, wires 144, 145, 139 to wire 131, thus closing switch 146 to provide current from battery 147 through wires 148, 149, mercury switch C, wire 150, exciter lamp 151, wire 152 to battery 147 thus causing the illumination of lamp 151.

Initial movement of motor 98 will also momentarily close mercury switch I shown in Fig. 20, thus closing a circuit from wire 120, through wires 153, 154, 155, mercury switch I, wires 156, 157, 158, normally closed mercury switch E, wires 159, 160, main motor 49, wires 161, 162, 163, to power wire 131, thus starting the main motor.

Revolution of the main motor 49 will cause revolution of cams 91 and 92 which will immediately close normally open mercury switch B, thus providing a hold-up circuit on motor 49, through wires 163, 162, 161, motor 49, wires 160, 159, mercury switch B, wires 164, 153 to power wire 120, thus causing motor 49 to produce a complete revolution of shaft 93 and a complete out and back movement of the sound reproducer. At the same time normally closed switch A will be opened to prevent an operation of the record shifting motor 43, the circuit of which will be described, in order that the record shifting operation may not be carried out while the sound reproducing action is in process.

When the sound reproducing head reaches the end of its outward travel, mercury switch C will be shifted to extinguish lamp 151 and through wire 165 to energize exciter lamp 166 through wire 167, 152 to battery.

The solenoid switch 143 will be held closed during the operation of the main drive motor because its circuit is controlled by mercury switch B.

The timing motor 48 is at all times energized through wires 163 and 153 respectively in connection with the power wires 120 and 131 and through the cam 47 will cause at the end of each minute a circuit to be closed from wire 120 through wires 153, 168, switch D, wire 169, motor 43, wires 162, 163 to wire 131. Therefore at each closure of the mercury switch D the timing motor 43 will be started into operation. Its initial turning movement will close a circuit from power wire 120 through wires 153, 170, normally closed switch A, wires 171, 172, mercury switch F, wire 173, motor 43, wires 162, 163, to power wire 131. This circuit will be available when the sound reproducing is not in action to provide a hold-up circuit for timer 43 to cause a complete revolution of shaft 42 to shift the records, as described, but if the sound reproducer is in action, mercury switch A will be opened.

Therefore after the initial movement of the motor 43, due to the circuit first described therethrough, the motor will be stopped until the mercury switch A is again closed when it will be able to complete its action of shifting the records.

The revolution of motor 43 will also open the normally closed switch E which controls the initial action of the main motor 49, and therefore the main motor cannot be started while the record shifting motor 43 is in action.

The variation of the photo electric cells 80 produced by the sound film record is amplified by the amplifier in the cylinder 75, passed through a second audio frequency amplifier 174, the voice currents passing by way of wires 175, 176, to modulate the voice coil 112 thereby impressing the announcement upon the telephone by induction.

When the solenoid switch 128 is energized and closes switch 133, a locking circuit through mercury switch J, which is normally closed, is provided by wires 120, 122, 123, switch 133, wire 138, switch J, wire 127, coil 128, wires 129, 130 to 131. This circuit will hold the call until motor 98 starts to initiate the response when it will be broken to release switch 128 ready for a succeeding call. While coil 128 is thus energized, switch 132 will also be closed but since the initial motion of the motor 98 depends upon a circuit through mercury switch G, which is broken during sound reproducing action, motor 98 will be held from operation but will be immediately started when the existing action of the mechanism terminates.

If, therefore, but one telephone is being served, all others will be held out and all calls that have been "stored" will be served when the one in process is completed. Should there be stored calls waiting when motor 49 completes a cycle, it will immediately be again started by closed switch 132 in series with G unless the motor 43 has started to make a record shift which is held against completion during action of motor 49. If motor 43 has made a start to shift a record, it will have opened switch E so that motor 49 cannot be started until the record is shifted. As between a stored call and record shifting operation therefore, the latter will have preference in order to not announce an incorrect minute.

The use of reflected light from a photographic sound record is not new. However, in former structures for using this method, of which I am aware, the reflection has been wholly or mainly from the surface of the record, the modulation being produced by relative darkening of adjacent portions of the record by the photographic process. In the structure disclosed herein, the portions of cylinders 27 and 28 underlying the transparent film record utilized is made highly reflective as by chromium-plating the bottoms of the grooves, if metallic cylinders are used, or by placing a thin ribbon of chromium plated metal in the bottoms of the grooves, if non-metallic cylinders are used.

Figure 3:
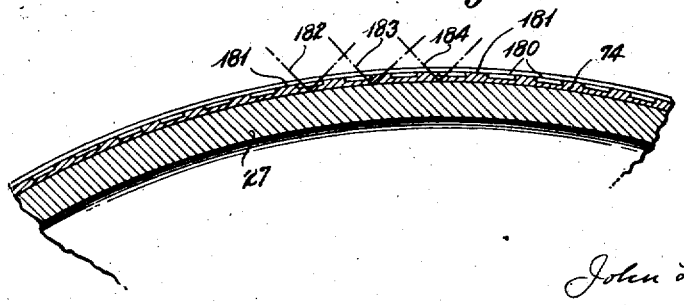
Fig. 3 is a diagrammatic view illustrating the method of using a film record.
Figure 4:
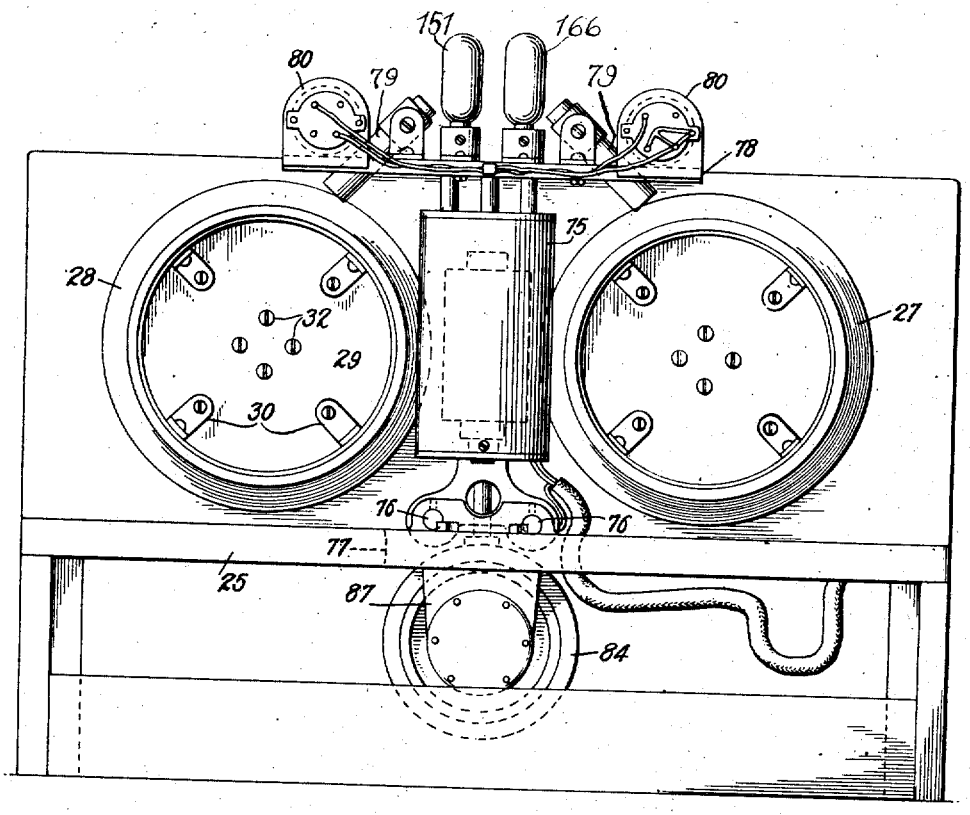
Fig. 4 is an end view from a direction opposite to the view of Fig. 2.

It is found that by this expedient a marked improvement of tone quality results above that of any other method. The best theory known to me to account for the improvement is as follows: The natural sound of the voice is a substantially continuous tone. When this is applied to a photo film in the usual manner, dark areas 180, Fig. 3, are produced separated by transparent areas 181. When reproduced by transmitted light or light reflected from the surface of the film, these areas act cleanly in sequence. By my method however, a ray at one time passes in and out again through a dark portion 180, as at 182, then in through a portion of the same dark area and out of the adjacent transparent area 181 in the manner indicated at 183, then in at a transparent area and out at a dark area as indicated at 184. At times the ray may be passing both in and out through the same transparent area. Some of the dark areas may be sufficiently opaque to cut off the light almost altogether, which does not detract from the correctness of the theory.

In this manner the effect of the adjacent dark areas is elided, reproducing a substantially continuous tone which is very natural.

*Operation*

The operation should be clear from the above description. To summarize: The device may be associated with a plurality of telephones, the control of the telephones being in parallel.

The ringing of a bell when the device is idle causes the receiver lifting motor to start to lift the receiver and action of this motor causes the sound reproduction motor to start. Once started, each of these motors will complete a cycle and then stop.

The minute announcing record is changed each minute and the hour record at the end of each hour, but record shifting cannot take place while the main motor is running, nor can the main motor be started while a record is being shifted.

The calls over all phones that are completed while other telephones are being answered are stored, and all thus stored calls are answered together when a cycle in process is completed.

*General advertiser*

The mechanism described may be used for other purposes than time announcing, as for instance for general advertising.

A diagram of circuits for controlling the mechanism of Figs. 1–16 for such a purpose is illustrated in Fig. 24. When used in this manner the telephone associating mechanism and circuits are omitted.

In this form the time motor 48 is continuously running and may be geared to shift records at intervals other than one minute and also if desired, cam 65 may be modified to at all times shift the records simultaneously, in an obvious manner.

Mercury switches F and E are both controlled by the form of cam shown at 185 in Fig. 25 driven by motor 48. When the high point on the cam acts, mercury switch E will close to complete a circuit from wire 131, through wires 186, 187, motor 49, wires 188, 189, 190, 191, mercury switch E, wires 192, 193 to wire 120. Starting of motor 49 controlling switches A and C will close A, placing a hold circuit on the motor through wires 193, switch A, wires 189, 188, motor 49 and wires 187, 186 to 131, thus causing motor 49 to produce a cycle of sound reproduction and stop by opening switch A. This action will take less time than one-half revolution of cam 185.

The closing of switch A will complete a circuit through wires 131, 194, switch 143, wires 195, 189, switch A, wires 193 to 120, causing lighting of the exciter lamps. When the low spot on cam 185 acts, switch F will be closed to start motor 43, which will close its hold switch D and complete a record shifting action.

Minor changes may be made in the physical embodiments of the invention within the scope of the appended claims without departing from the spirit thereof.

I claim:

1. In a device of the class described, in combination: a revoluble support; a plurality of sound records extending spirally at least partially around said support to be brought successively into position to be reproduced; means to reproduce sound from said records; and automatically actuated means to change the record in position to be reproduced, by circumferential movement of said support.

2. In a device of the class described, in combination: a revoluble support; a plurality of sound records extending spirally at least partially around said support; means to reproduce sound from said records; automatically actuated means to change the record in position to be reproduced, by circumferential movement of said support; and time controlled means to initiate action of said record changing means at predetermined intervals.

3. Changeable phonographic announcing mechanism comprising, in combination: normally stationary announcing means; sound record shifting means; means to automatically cause action of said shifting means at intervals; means to prevent initiation of movement of said announcing means while said shifting means is acting; and a plurality of sound records successively moved to announcing position by said shifting means.

4. Telephonic announcing mechanism comprising, in combination: a telephone circuit; phonographic reproducing means to modulate the telephone circuit; means to associate said telephone circuit with said means when a call is received; means to shift the sound records of said phonographic means to cause desired announcement thereby; and control means acting when one of the three first named means is operating to prevent operation of either of the other two.

5. Telephonic announcing mechanism comprising, in combination: normally stationary phonographic reproducing means; a plurality of called telephones; sound record shifting means; means to associate any of a plurality of said telephones with said phonographic means; and control means to delay association of telephones over which calls are completed while either of the first two named means is acting and to complete said delayed association and initiate renewed movement of the reproducing means thereafter.

6. Telephonic announcing mechanism comprising, in combination: normally stationary phonographic reproducing means; a plurality of called telephones; means to associate any called telephones of said plurality simultaneously with said first named means; and means responsive to completion of a call on any of said telephones to cause movement of said first named means.

7. Telephonic announcing mechanism comprising, in combination: a plurality of called telephones; normally stationary phonographic reproducing means common to said telephones; a plurality of means each individual to one of said telephones to associate the same with said reproducing means upon completion of a call thereon; means common to said telephones to delay action of the second named means in response to calls on any telephones completed while the first named means is acting and to initiate such delayed response and renewed movement of the reproducing means thereafter.

8. Phonographic announcing mechanism comprising, in combination: a pair of cylindrical record carriers; sound records spirally mounted on said carriers; a reproducer head common to said carriers; reproducing means mounted on said head individual to said carriers; means to cause "out" and return traversing movement of said head over said carriers; means to cause one reproducing means to be active during the "out" movement and the other during the return movement; said last named means and said movements timed to cause a continuous announcement from the pair of records on said carriers.

9. Phonographic announcing mechanism comprising, in combination: a pair of record carriers; a plurality of sound records mounted on each of said carriers; a reproducer head common to said carriers; reproducing means mounted on said head individual to said carriers; means to cause "out" and return traversing movement of said head over said carriers; means to cause one reproducing means to be active during the "out" movement and the other during the return movement; said last named means and said movements timed to cause a continuous announcement from the pair of records on said carriers; and automatically acting means to move said carriers to bring different records to acting position.

10. Time announcing means comprising, in combination: minute and hour record carriers; sixty and twelve sound records spirally mounted on and extending at least partially around the respective carriers; the ends of said records terminating at an edge of each carrier at points equidistantly spaced thereabout; time controlled means to shift said carriers one-sixtieth of a revolution each minute and one-twelfth of a revolution each hour respectively; reproducing means movable over said carriers and means to move said reproducing means to announce the hour and minute seriatim in cooperation with the sound records then in active position.

11. The combination of claim 10 in which the record carriers are cylinders.

12. The combination of claim 10 in which the record carriers are cylinders; the sound records are partially transparent photographic films; the reproducing means comprise sources of light and light-sensitive cells acting by reflected light; and with a reflecting surface underlying each sound record.

13. Phonographic apparatus comprising, in combination: a film support; a reflecting surface carried by said support; a partially transparent photographic film sound record on said support; a source of light; a light-sensitive cell arranged to be affected by light from said source reflected from said surface through said film; and an electric circuit connected to have current therein modulated by said cell.

14. Phonographic announcing apparatus comprising, in combination: a revoluble record carrier; a plurality of sound records carried thereby spirally thereof and terminating at positions at an edge thereof; drive means to turn said carrier in a reproducing direction; drive means to turn said carrier to change the record to be reproduced; said drive means each permitting free revolution of said carrier in response to the other.

15. Phonographic announcing apparatus comprising, in combination: a revoluble record carrier; a plurality of sound records carried thereby spirally thereof and terminating at equidistantly spaced positions at an edge thereof; drive means to revolve said carrier in a reproducing direction; drive means to turn said carrier step by step in record changing movement to bring successive records into reproducing position; each of said drive means permitting free movement of the carrier in response to the other.

16. Phonographic apparatus for use with light-sensitive cell reproducing means comprising, in combination: a cylinder having a groove in its surface; a reflecting surface in the bottom of said groove; a partially transparent photographic film sound record mounted in said groove and overlying said surface.

17. Phonographic time announcing mechanism comprising, in combination: a telephone; a plurality of sound records; a shifting motor geared to change said records; a main motor geared to drive said records; a motor geared to associate said telephone with said records; control switches for the respective motors; and a governing switch in series with each of said control switches, each actuated by one of the other motors to prevent conflicting action of any two motors at the same time.

18. Phonographic time announcing mechanism comprising, in combination: time announcing means embodying a record carrier; a plurality of records on said carrier; record changing means; a motor geared to drive said announcing means for announcement movement of the record carrier; a motor geared to drive said record changing means to cause record changing movement of the carrier; a time controlled switch to start the last named motor at definite intervals; a holding switch in the circuit of said second named motor controlled thereby to cause completion of the record changing action; a switch in series with the last named switch held open by operation of the first named motor; said record changing gearing including an intermittent gear so as not to interfere with the action of the first named gearing when the record changing gear is partially operated.

19. Phonographic telephone answering mechanism comprising, in combination: a called telephone set; a cam to lift the receiver of said called telephone; a motor to drive said cam; a switch responsive to the action of a telephone ringer to start said motor; phonographic telephone answering means; a main motor to drive said last named means; a switch closed by operation of said telephone motor to start said main motor; a switch closed by said first named motor to cause completion of its receiver lifting action; a normally closed switch opened by operation of said main motor in series with said last named switch to prevent action of the first named motor while the main motor is running; and means to hold said first named switch closed during operation of said main motor.

20. Phonographic telephone answering mechanism comprising, in combination: a usual called telephone set; a receiver lifting cam; a motor to drive said cam; a switch closed in response to action of the telephone ringer to start said motor; film sound record telephone answering means comprising a source of light; a switch closed in response to action of a telephone ringer; means operated by said last named switch to energize the light source of the answering means; a main motor to drive said answering means; a switch closed by operation of said first named motor to start said main motor; a holding switch closed by said main motor to cause completion of its answering action and subsequently broken thereby to stop said main motor.

21. Phonographic telephone answering mechanism comprising, in combination: a usual called telephone set; receiver lifting means; a motor to drive said means; a switch responsive to the action of the ringer of the telephone to start said motor; a switch closed by initial operation of said motor to cause the motor to complete its action and broken by said action to stop said motor; phonographic telephone answering means; a main motor to drive said means; a switch closed by the first named motor to start said main motor; a holding switch moved by said main motor to cause complete action thereof and then broken thereby to stop said main motor; a normally closed switch in series with the starting switch of said first named motor, said normally closed switch opened by initial action of said main motor to prevent the first named motor from starting while the main motor is operating.

22. Time announcing mechanism comprising, in combination: a pair of record cylinders; minute and hour announcing sound records carried by the respective cylinders; each of said cylinders mounted to revolve upon a shaft; a member rigid with said shaft; means to drive said rigid member in sound reproducing direction comprising a member journalled upon said shaft having ratchet engagement with said rigid member; means to shift said cylinders in a direction to change the records comprising a gear journalled upon said shaft, an overrunning clutch between said gear and said rigid member, and means to move said gear at definite time intervals.

23. Time announcing mechanism comprising, in combination: a pair of parallel shafts; a pair of cylinders mounted on said shafts respectively; twelve sound records for announcing the hours carried by one of said cylinders; sixty sound records carrying the minute announcement upon the other of said cylinders; a record shifting motor; a shaft driven thereby; a disk upon said shaft carrying a pin; an intermittent gear to be actuated by said pin once during each revolution thereof; a gear mounted upon each of said parallel shafts; a pinion carried by the hub of said intermittent gear in mesh with the gear upon the minute shaft; an overrunning clutch to drive said minute shaft on said gear; a cam carried by said gear; an arm operated by said cam; a rack carried by said arm in mesh with the gear upon the hour shaft whereby to move said hour shaft to shift the hour records once during each full revolution of the minute record shifting gear; means to energize said motor once each minute to cause full revolution of said motor shaft at each energization of the motor; means to drive said cylinders in the record changing direction independently of the described record shifting movement; and a reproducing head driven by said cylinder drive actuated to coact with the records upon said cylinders seriatim to provide a continuous announcement of the hour and the minute.

24. The method of utilizing a photographic film record comprising recordings of varying opacity carried by a transparent film which method comprises passing light through the records and film; and causing the light to be reflected again through the film from a reflecting surface behind the film whereby to vary the intensity of the reflected light in accordance with the relative opacity of various portions of the record.

25. The method of sound reproduction which comprises passing light from a source thereof through a partially transparent photographic film sound record; causing said light to be reflected from a surface closely adjacent to the back of said film again through the film, and modulating an electric current in accordance with variations of said reflected light.

26. Phonographic apparatus for use with light sensitive cell reproducing means comprising, in combination: a record carrier having a reflecting surface; and a partially transparent photographic film sound record mounted on said carrier and overlying said surface.

27. Phonographic telephone answering apparatus comprising, in combination: a pair of record carriers; film sound records mounted on said carriers; a reproducer head; a pair of exciter lamps carried by said head individual to said records; an exciter lamp switch; means to move said head "out" and return; telephone associating means; means actuated by said associating means to start said head moving means; means actuated by said telephone associating means to close said exciter switch whereby to light one of said lamps during "out" movement of the head; and means actuated by moving means to extinguish the lighted lamp and to light the remaining lamp for the return movement of the head.

28. Phonographic announcing apparatus comprising, in combination: a rigid revoluble record carrier; a plurality of sound records carried by said carrier, extending spirally at least partially around the same and terminating at an edge thereof at equidistantly spaced points about its circumference; means to reproduce sound from said records; and automatic means to intermittently move said carrier circumferentially the distance between said points for record change.

29. Phonographic announcing apparatus comprising, in combination: revolubly mounted cylindrical sound record-carrying means; a plurality of sound records mounted on said means; a reciprocable sound reproducing head coacting with said records; means to cause reciprocation of said head comprising a revoluble drum having a double spiral cam to cause "out" and "return" movement of said head; and means acting at the end of the "out" movement of the head to change the record coacting with the head upon the "return" movement of the head.

30. Phonographic announcing apparatus comprising, in combination: a pair of record carriers; photographic sound records mounted thereon; drive means for said carriers; a reproducing head; light sources carried by said head for coaction with the respective records on said carriers to reproduce sound; means to cause "out" and "return" movements of said head; means to energize one light source only during the "out" and the remaining light source only during the "return" movement of the head; and means to cause both sources to be energized momentarily at the end of the "out" movement to avoid a break in the sound reproduction from the two records.

31. Phonographic announcing apparatus comprising, in combination: a revoluble carrier; a plurality of sound records carried thereby spirally thereof and terminating at positions at an edge thereof; drive means to turn said carrier in a reproducing direction; drive means interposed between said first named means and the carrier to turn said carrier to change the record to be reproduced; said drive means each permitting turning movement of the carrier in response to the other.

32. Phonographic announcing mechanism comprising, in combination: a plurality of record carrying cylinders mounted for revolution; a plurality of sound records carried by each of said cylinders in multiple screwthread arrangement thereon and terminating at equidistantly spaced points about the circumference thereof at ends of the cylinders; the length of the record and the pitch of the screwthread arrangement thereof differing between the cylinders; a reproducing head mounted for travel parallel with the axes of the cylinders; reproducing means carried by said head for said respective cylinders; means to cause "out" and "return" movement of said head at speeds corresponding to the respective pitches of said screwthread arrangements; means to revolve said cylinders during sound reproduction; and means to cause respective of said reproducing means to be active during "out" and "return" movements.

JOHN L. FRANKLIN.